Patented Feb. 26, 1946

2,395,565

UNITED STATES PATENT OFFICE 2,395,565

PROCESS OF EXTRACTING CARBON DIOXIDE FROM GASES

Frank Henderson May, Trona, Calif., assignor to American Potash & Chemical Corporation, Trona, Calif., a corporation of Delaware No Drawing. Application October 17, 1942, Serial No. 462,425

8 Claims. (Cl. 23—150)

This invention relates to a process of extracting carbon dioxide from gases containing the same.

In my copending application, Serial No. 460,278, filed on September 30, 1942, I have described a process for extracting carbon dioxide from gases, in which process there is employed an absorbing medium containing potassium borate material in sufficient concentration so that potassium pentaborate octohydrate ($K_2B_{10}O_{16}.8H_2O$) will be precipitated during the steps of absorbing the carbon dioxide from the gases and so that there will be simultaneously formed in solution potassium bicarbonate. In the process of said copending application, precipitated potassium pentaborate ($K_2B_{10}O_{16}.8H_2O$) is re-dissolved in the liquid component of the absorbing medium during the desorbing operations. By the process of said copending application, the amount of carbon dioxide which may be recovered from a given quantity of absorbing medium is greatly increased over and above that attainable by processes in general use, and at the same time the amount of water vapor liberated with the carbon dioxide in the boiling off operations is greatly reduced with a consequent lowering of steam, or heat requirements.

The process of such copending application utilizes an absorbing medium, the components of which belong to either the system: potassium, borate, carbonate, and water, or to the system: potassium, sodium, carbonate, borate, and water. In the operation of the process of said copending application, it is essential that the potassium in the solution phase of the absorption medium shall be in a material part present in the form of potassium tetraborate. In order to form the absorbing medium of the process of said copending application, at least part of the potassium component of the system must be originally provided in a form more basic than potassium pentaborate ($K_2B_{10}O_{16}$). Thus, for example, it must be provided in the form of potassium tetraborate or potassium carbonate. Potassium tetraborate and potassium carbonate are both relatively expensive materials, and, therefore, there is some disadvantage in using an absorbing medium composed of such materials.

It is a general object of the present invention to provide a process for extracting carbon dioxide from gases, which retains the principles and advantages of the process of the above-mentioned copending application, utilizing the precipitation of potassium pentaborate octohydrate during the absorption operation and its resolution during the desorbing operations. The present improved process utilizes an absorbing medium producible without requiring the potash element to be provided in the basic form, or in which very little of said expensive materials is needed. This improved process possesses further advantages over the process of the aforesaid copending application.

The improved process of the present invention utilizes an absorbing medium containing chloride as a component of the system; that is, the system includes the elements potassium, sodium, carbonate, borate, chloride, and water. Such a system has the advantage that a suitable absorbing liquor for the process may be formed employing potassium chloride, potassium pentaborate octohydrate, borax, and sodium bicarbonate, and water, so that the absorbing medium may be provided at a relatively low cost.

I have discovered that the presence of the chloride ion in the absorbing medium not only does not interfere with the efficiency of the process, but actually enables additional advantages to be attained in practice; among which are the fact that by the improved process of this application the absorbed carbon dioxide may be driven off the absorbing medium with even a lower evaporation of water and a lower steam, or heat consumption than is generally the case in the process of the copending application.

The improved process of the present invention, together with a number of additional advantages of the invention, will be more readily understood from the following description of a number of examples of the process. Since the process of the present invention is a cyclic one, the description of the process may commence at any stage.

In describing the first example of this process, I have elected to describe the operation of the process starting with the absorbing medium as attained at the end of the absorbing or carbonation operation. In this example (1) of the process, the components of the absorbing medium are in the form of a sludge, consisting of a solution substantially saturated at the final temperature of carbonating operations (for example, 30° C.) with potassium chloride (KCl) and sodium tetraborate decahydrate (borax, $Na_2B_4O_7.10H_2O$), together with a precipitate of potassium pentaborate octohydrate ($K_2B_{10}O_{16}.8H_2O$), and sodium bicarbonate ($NaHCO_3$).

To start the process, such a sludge might be formed by adding to 100 parts by weight of water:

| | Parts |
|---|---|
| Potassium chloride (KCl) | 39.6 |
| Borax ($Na_2B_4O_7.10H_2O$) | 23.4 |
| Sodium bicarbonate ($NaHCO_3$) | 26.6 |
| Potassium pentaborate octohydrate ($K_2B_{10}O_{16}.8H_2O$) | 43.1 |

The larger proportion of these solids dissolves at 30° C., forming a solution, the composition of which may be expressed by the following empirical analysis:

| | |
|---|---|
| KCl | 39.6 |
| $Na_2B_4O_7.10H_2O$ | 23.4 |
| $NaHCO_3$ | 10.1 |
| $K_2B_{10}O_{16}.8H_2O$ | 4.7 |
| $H_2O$ | 100.0 |

The undissolved solids comprise about 16.5 parts $NaHCO_3$ and 38.4 parts $K_2B_{10}O_{16}.8H_2O$. Thus, a sludge, comprising solution and suspended solids, is attained having a suspended solid content of little less than 25% by weight, which sludge can be easily managed in suitable equipment, such as pumps, pipes, absorbers, etc.

It will be noted that in producing the aforesaid sludge no basic potassium borate compound is required. It is, of course, to be appreciated that while one of the advantages of the process of the present invention is that the absorbing medium may be produced without the use of such basic potassium compounds as $K_2B_4O_7.4H_2O$ or $K_2CO_3$, obviously, if desired, basic potassium compounds might be used in forming the absorbing medium of the present invention.

All of the reagents specified as required to form the absorbing medium of the foregoing example (1) are commercial products, and relatively inexpensive. High grade potassium chloride (KCl) and borax ($Na_2B_4O_7.10H_2O$) are available at low prices from commercial production at Searles Lake, California. Sodium bicarbonate is a cheap reagent—it could also be supplied to the present process by carbonating the even cheaper soda ash of commerce. Potassium pentaborate is fundamentally the cheapest potassium borate by virtue of the ease and efficiency by which it may be produced. For example, it may be practically produced by the operation of the process described in Gale Patent No. 2,094,881, issued on October 5, 1937.

The partial pressure of carbon dioxide over this sludge—or more correctly stated, over the liquid portion thereof—at 30° C. is about 53 mm. It is to be understood, of course, that the precipitated or undissolved solids present in the sludge have no effect upon the partial pressure of carbon dioxide in equilibrium with the liquid phase of the sludge—the composition and temperature of the solution, i. e., liquid portion of the sludge solely determine said partial pressure. As a corollary, the reason for the efficacy of my system is that precipitating the acid salts and removing them from the sphere of influence of the liquid system, during carbonation, assures maintenance of low carbon dioxide partial pressures, despite absorption of large quantities of acidity ($CO_2$) from the gases. In short, I remove acidity as a precipitate rather than leave it in the liquor to fight back at further absorption.

The solution portion of the sludge, in addition to being saturated with potassium pentaborate octohydrate and sodium bicarbonate, in this example is also saturated with potassium chloride and borax, although obviously variations of the process may be used in which somewhat less or somewhat more of these ingredients may be present over that required for exact saturation.

It is a fundamental feature of the process of my invention that the solution possess potassium chloride in appreciable concentration. I have found this reagent (KCl) to be valuable, especially when the system chosen is intended to approach saturation with, or to precipitate $NaHCO_3$ (with the precipitation of $K_2B_{10}O_{16}.8H_2O$) during the absorption or carbonation operation. For example, if all of the potassium chloride were omitted in producing the absorption medium of example 1 (i. e., a solution saturated only with borax, potassium pentaborate octohydrate and sodium bicarbonate), the partial pressure of carbon dioxide at 22° C. would be about 364 mm. By adding enough KCl to one-third saturate the solution, the partial pressure of carbon dioxide at 36° C. is lowered to about 207 mm. At two-thirds saturation of the solution with KCl, the partial pressure of carbon dioxide at 35° C. is lowered to about 99 mm. At full saturation with potassium chloride, the partial pressure of carbon dioxide drops to 62 mm. at 34° C., or 53 mm. at 30° C., which is the condition obtained in the foregoing example.

The foregoing data illustrate the fact that the potassium chloride element of the absorbing medium is a valuable adjunct, and I recommend that it be employed in considerable amount. The reason for the improvements effected by the presence of the potassium chloride can not be definitely stated, but I believe the explanation for these improvements to be that the solubility of bicarbonate is materially depressed by the presence in the solution of the added potassium chloride. The removal from the solution of as much of the acidic constituents as possible renders the absorbing liquor a better medium for accepting carbon dioxide. Another beneficial action of the added potassium chloride is to markedly increase the solubility of the basic borates (tetraborates), which likewise renders the absorbing liquor a better medium for accepting carbon dioxide.

In the process of this invention, the described sludge is then heated to evolve the carbon dioxide absorbed in the carbonating operation. The suspended solids of the sludge dissolve easily, passing entirely into solution at a temperature of about 70–80° C. By so passing into solution, they acidify the solution and materially aid in the desired evolution of carbon dioxide therefrom. By continuing the heating until the solution attains a temperature of about 100–105° C. (depending on the pressure), the carbon dioxide content of the solution is easily reduced to 10 parts $NaHCO_3$ per 100 parts of excess water. In Example 1 described above, the solid $K_2B_{10}O_{16}.8H_2O$ and the solid $NaHCO_3$ of the described sludge enter into a decomposition reaction, which may be represented by the following equation:

$$2K_2B_{10}O_{16}.8H_2O + 6NaHCO_3 + 19H_2O =$$
$$3Na_2B_4O_7.10H_2O + 2K_2B_4O_7.4H_2O + 6CO_2$$

Compared with the processes in general use, the process of the present invention has several important advantages. The complete and easy solution of the precipitated absorber-sludge solids upon mild heating is of considerable practical importance. The desorber equipment may be made and operated in a simple fashion. Another outstanding advantage of the present system is the low heat, or steam, requirements necessary to liberate the carbon dioxide. As a test to illustrate this advantage of the process of the present invention, I have placed a sludge of the described composition in a flask fitted with a sealed agitator, a thermometer submerged in the liquid, and a connection leading to an off-side condenser. The lower end of the condenser was submerged in strong sulphuric acid provided for absorbing all water distilled from the flask during the liberation of the carbon dioxide. Upon heating the flask to liberate carbon dioxide and simulate the desorbing operation of a commercial plant, I found that all of the solids had dissolved when the solution had been heated to about 70° C. Brisk evolution of carbon dioxide began at about 60° C. The boiling was continued until the solution reached a temperature of 100° C., the solution being stirred the while. By carefully weighing the flask and water absorber, I obtained the results tabulated below:

| Temp. up to— | Percent of the $CO_2$ expelled at 100° C. | Ratio water/$CO_2$ by weight |
|---|---|---|
| 70° C | 52 | 0.14 |
| 80° C | 65 | 0.14 |
| 91° C | 79 | 0.17 |
| 97° C | 91 | 0.23 |
| 100° C | 100 | 0.30 |

The boiling operation at 100° C. resulted in a yield of 0.42 pound of $CO_2$ per gallon of sludge.

In this first example of the process, the desorbing operations were conducted until the solution reaches a temperature of 100° C., but such boiling might have been conducted to a higher or lower temperature. The carbon dioxide is driven off the solution with an extremely low evolution of water and extremely low steam consumption. The solution is then cooled to a suitable temperature for absorption of carbon dioxide and then employed for absorbing carbon dioxide. When the solution is cooled, the solution becomes oversaturated with respect to the basic borates, potassium tetraborate ($K_2B_4O_7.4H_2O$) and sodium tetraborate ($Na_2B_4O_7.10H_2O$). These tetraborates have substantial tendencies to remain supersaturated, and it is desirable to maintain them in a metastably supersaturated state. If they are maintained in a metastably supersaturated state as the absorbing medium is passed to the carbonation operation, the absorbing medium has an extremely low partial pressure of carbon dioxide. Even when part of the basic borates are allowed to crystallize, the absorbing medium may still possess very low partial pressures—for example, 12 mm. at 35° C.

By increasing the amount of $K_2B_{10}O_{16}.8H_2O$ present in the sludge over that required to react with the precipitated $NaHCO_3$—for example, from 43.1 parts to 63.1 parts—the amount of $CO_2$ recovered per cycle may be increased about 20% at the expense of handling a denser sludge. This increased yield of $CO_2$ is obtained without increasing the steam consumption per unit of $CO_2$ recovered.

In a second example of my process, I employ only sufficient sodium bicarbonate to substantially saturate the liquid phase of the sludge produced at the end of the carbonating operations with sodium bicarbonate—and include in the sludge no solid phase of sodium bicarbonate. In order to produce such sludge to start the process, I may, for example, employ the same proportions of potassium chloride, potassium pentaborate octohydrate, borax, and water as in the first example; but in place of adding 26.6 parts of sodium bicarbonate, as in the first example, I add only 10 parts of sodium bicarbonate. As a result, I produce a sludge containing as a solid phase at 30° C. only potassium pentaborate octohydrate and a solution having substantially identically the same composition as the solution specified in the first example. Such a sludge may be heated in order to expel the carbon dioxide at any suitable temperature, say 100° C., and then cooled and employed in the absorbing or carbonating operation. As a test, to illustrate this process, I have placed a sludge of the composition of Example 2 above in a suitable flask, and conducted a desorption operation similar to that made in Example 1. I obtained the results tabulated below:

| Temp. up to [1] | Percent of the $CO_2$ expelled at 100° C. | Ratio $H_2O/CO_2$ by weight |
|---|---|---|
| 75° C | 50 | 0.13 |
| 85° C | 67 | 0.14 |
| 95° C | 87 | 0.20 |
| 100° C | 100 | 0.32 |

[1] All solids in solution at 80° C.

During the desorbing operations, the potassium pentaborate dissolved and reacted with the sodium bicarbonate in solution to liberate carbon dioxide, with the result that at the end of the desorbing operations the total amount of carbon dioxide remaining in solution, expressed as sodium bicarbonate, was reduced to very low values; for example, in this case, it was reduced from the aforesaid value of 10.1 parts per 100 parts of excess water to about 1.2 parts of sodium bicarbonate as determined from the amount of $CO_2$ expelled. The approximate yield of $CO_2$ for this sludge was 0.26 pounds per gallon. The $CO_2$ partial pressure over the supersaturated desorber liquor in the above example was determined to be 19 mm. at 35° C.

Throughout this specification, when I speak of the partial pressure of $CO_2$ in terms of millimeters (mm.), I refer to the common terminology wherein such pressures are referred to as mm. of mercury. An advantage of the second example of my process over the first example described is that the sludge utilized in the second example is a lighter sludge, and somewhat more easily handled than that of the first example.

The foregoing two examples of my process illustrate that the process may operate with varying quantities of sodium bicarbonate present, including quantities less than sufficient to saturate the solution leaving the desorber, up to quantities in substantial excess of saturation of the solution, i. e., sufficient to cause the formation of a precipitated solid phase of sodium bicarbonate. These examples further illustrate that the ratio of potassium pentaborate to sodium bicarbonate present in the finished absorbed sludge may vary over a considerable range. I recommend, however, that in the absorbing medium leaving the carbonation operation there should be an excess of potassium pentaborate over that required to react with the quantity of sodium bicarbonate which the operator intends to decompose in the subsequent desorption steps.

The solution accompanying the sludge described in the previous examples of the invention is not saturated with potassium tetraborate tetrahydrate. It may be desirable to employ an absorbing medium, which at the end of the carbonating or absorbing operations is saturated with potassium tetraborate tetrahydrate. It is desirable to have in solution considerable basic borate at the end of the carbonation operation, as such basic borate decreases the partial pressure of carbon dioxide over the solution. Such a solution might be produced by adding about 9 parts of potassium tetraborate tetrahydrate to the sludge described in Example 1, but I preferably produce such a solution by varying the proportions of ingredients specified in Example 1.

Accordingly, as a third example of my process, I form a sludge by adding to 104.9 parts by weight of water:

| | Parts |
|---|---|
| Potassium chloride (KCl) | 40.6 |
| Potassium pentaborate octohydrate ($K_2B_{10}O_{16}.8H_2O$) | 63.2 |
| Borax ($Na_2B_4O_7.10H_2O$) | 11.5 |
| Sodium bicarbonate ($NaHCO_3$) | 35.8 |

By using the materials described, a sludge is formed which might be described as a sludge further carbonated than is generally practised in the third example of my process. To start the cyclic process now being described as Example 3, such sludge is subjected to a desorption operation in which it is heated to a temperature of about 100° C. to drive off carbon dioxide. It is then cooled and employed as an absorbing medium in a carbonation or absorption operation, the carbonation being conducted so as to produce a sludge which, at the end of the normal complete carbonation operation at 35° C., has a solution which may be represented by the following empirical analysis:

| | |
|---|---|
| KCl | 40.6 |
| $K_2B_{10}O_{16}.8H_2O$ | 8.1 |
| $K_2B_4O_7.4H_2O$ | 8.7 |
| $Na_2B_4O_7.10H_2O$ | 27.8 |
| $NaHCO_3$ | 12.1 |
| $H_2O$ | 100.0 |

The precipitated solids comprise about 16.5 parts of $NaHCO_3$ and 38.4 parts $K_2B_{10}O_{16}.8H_2O$.

The $CO_2$ partial pressure over this fully carbonated sludge of the above composition is 57 mm. at 34.8° C.

To illustrate the efficacy of this process, I have duplicated the desorbing tests of Examples 1 and 2 by using the above normal, fully carbonated, sludge and heating to 100° C. as in the previous tests. The results I attained are tabulated below:

| Temp. up to [1] | Percent of the CO₂ expelled at 100° C. | Ratio water/CO₂ by weight |
|---|---|---|
| 76° C | 58 | 0.09 |
| 85° C | 73 | 0.10 |
| 95° C | 89 | 0.15 |
| 100° C | 100 | 0.24 |

[1] All solids in solution at 76° C.

The approximate yield of $CO_2$ in the above test was 0.43 pound per gallon. The supersaturated, cooled desorber liquor has a $CO_2$ partial pressure of 19 mm. at 37° C.

In this example of the process, the 8.7 parts of potassium tetraborate tetrahydrate $$(K_2B_4O_7.4H_2O)$$

is produced by the following reaction:

$$2K_2B_{10}O_{16}.8H_2O + 6NaHCO_3 + 19H_2O = 3Na_2B_4O_7.10H_2O + 2K_2B_4O_7.4H_2O + 6CO_2$$

From the foregoing equation, it is seen that potassium tetraborate is formed by reaction of potassium pentaborate and sodium bicarbonate, with the simultaneous production of borax. It is, of course, recognized that this same reaction occurs in the other examples of this process and that potassium tetraborate is present in the solutions in the cycles of Examples 1 and 2, although not present as a saturating phase in the carbonator discharge sludge and not expressed in the empirical analysis of such sludges.

In the third example of the process, at the end of the normal carbonating operations, the solution accompanying the sludge produced is saturated with potassium tetraborate tetrahydrate. It is also saturated with potassium chloride. The presence of potassium chloride in the solution is necessary in order that all of the potassium tetraborate desired can be formed by the above-described reaction without exceeding saturation of the solution with borax.

It is undesirable in my process to substantially exceed saturation with respect to the tetraborates in the carbonator discharge sludge, as this represents an undesirable excess of basic material which is useless in the absorbing operation and may be undesirable in the desorption operation.

A desirable form of my process is one in which the solution accompanying the sludge attained at the end of the carbonation operation is just saturated with respect to both sodium and potassium tetraborate materials. This condition can not be achieved in the absence of some potassium chloride where reliance is placed upon the above-described reaction as the sole source of potassium tetraborate. Without the addition to the system of potassium chloride, the purchase of the expensive potassium tetraborate would be necessary.

It is not necessary, however, in all forms of my process to supply sufficient potassium chloride to saturate the solution accompanying the sludge derived from the carbonation operation. When sufficient potassium chloride is added to saturate said solution, it is necessary to add some borax, as in Example 3, in order that the solution shall be saturated with both potassium and sodium tetraborate. Upon decreasing the amount of potassium chloride added, the amount of borax necessary to add to achieve this saturation is progressively reduced until a point is reached where if the potassium chloride is further reduced it will then be necessary to start adding potassium tetraborate tetrahydrate, despite the potentialities of the above reaction.

In the 35° C. equilibrium system, such a condition is attained at a point saturated with respect to $NaHCO_3$, $K_2B_4O_7.4H_2O$, $Na_2B_4O_7.10H_2O$, $K_2B_{10}O_{16}.8H_2O$ and containing approximately 35.3 grams of KCl per 100 grams of excess $H_2O$.

A sludge meeting the above-described conditions may be made up by adding the following to 106.9 parts by weight of water:

| | Parts |
|---|---|
| Potassium chloride (KCl) | 35.3 |
| Sodium bicarbonate (NaHCO$_3$) | 38.8 |
| Potassium pentaborate octohydrate (K$_2$B$_{10}$O$_{16}$.8H$_2$O) | 69.2 |

By using the materials described, an "over-carbonated" sludge is produced. This sludge, when subjected to a desorption operation in which it is heated to a temperature of about 100° C. and subsequently cooled and employed as an absorbing medium in a carbonation or absorption operation, will at the end of the normal complete carbonation operation at 35° C. produce a sludge, the liquid portion of which may be represented by the following empirical analysis:

| | |
|---|---|
| KCl | 35.3 |
| Na$_2$B$_4$O$_7$.10H$_2$O | 22.9 |
| K$_2$B$_4$O$_7$.4H$_2$O | 12.2 |
| K$_2$B$_{10}$O$_{16}$.8H$_2$O | 7.3 |
| NaHCO$_3$ | 12.2 |
| H$_2$O | 100.0 |

The precipitated solids comprise about 16.5 parts of NaHCO$_3$ and 38.4 parts of K$_2$B$_{10}$O$_{16}$.8H$_2$O. This liquor is saturated with all of the above salts, save KCl. This example of the process was so chosen that 12.2 parts of potassium tetraborate tetrahydrate (K$_2$B$_4$O$_7$.4H$_2$O) and 22.9 parts of sodium tetraborate decahydrate (Na$_2$B$_4$O$_7$.10H$_2$O)

just sufficient to saturate the liquor at 35° C., were produced by the reaction:

2K$_2$B$_{10}$O$_{16}$.8H$_2$O + 6NaHCO$_3$ + 19H$_2$O →
3Na$_2$B$_4$O$_7$.10H$_2$O + 2K$_2$B$_4$O$_7$.4H$_2$O + 6CO$_2$

From the solution analysis given above, it is seen that all of the required Na$_2$B$_4$O$_7$.10H$_2$O and K$_2$B$_4$O$_7$.4H$_2$O are produced from the reaction of NaHCO$_3$, K$_2$B$_{10}$O$_{16}$.8H$_2$O and water. The partial pressure of CO$_2$ over the above fully carbonated sludge was found to be 61 mm. at 35° C.

In order to correlate these data with the previous examples, the normal carbonated sludge of the composition last mentioned was placed in a suitable flask and a desorption test made in the same manner as in the foregoing examples. The results I obtained are tabulated below:

| Temp. up to [1] | Percent of the CO$_2$ expelled at 100° C. | Ratio H$_2$O/CO$_2$ by weight |
|---|---|---|
| 75° C | 55 | 0.10 |
| 85° C | 68 | 0.12 |
| 95° C | 85 | 0.19 |
| 100° C | 100 | 0.32 |

[1] All solids in solution at 72° C.

The approximate yield of CO$_2$ from this particular sludge was 0.41 pounds per gallon.

If the amount of KCl added is further reduced, the solubility of the four saturating components (NaHCO$_3$, K$_2$B$_4$O$_7$.4H$_2$O, Na$_2$B$_4$O$_7$.10H$_2$O and K$_2$B$_{10}$O$_{16}$.8H$_2$O) vary to a considerable degree. For one thing, the solubility of NAHCO$_3$ increases. For example, if the amount of KCl be reduced from the foregoing (already unsaturated) value of 35.3 parts/100 parts H$_2$O to, say, about 25 parts/100 parts H$_2$O, then a solution simultaneously saturated with the last-mentioned four saturating phases will have the following composition:

| | |
|---|---|
| KCl | 24.8 |
| Na$_2$B$_4$O$_7$.10H$_2$O | 9.6 |
| K$_2$B$_4$O$_7$.4H$_2$O | 30.3 |
| K$_2$B$_{10}$O$_{16}$.8H$_2$O | 6.6 |
| NaHCO$_3$ | 16.6 |
| H$_2$O | 100.0 |

It will be seen that the NaHCO$_3$ solubility increases about one-third upon decreasing KCl by about 10 parts/100 parts H$_2$O. As would be expected, the partial pressure of CO$_2$ gradually increases (but not linearly) as the bicarbonate solubility increases; such increase would be undesirable in an absorbing medium. Hence, excessive reduction in the KCl content, with concomitant increase in NaHCO$_3$ solubility, would be undesirable under certain conditions.

However, it is one of the variations of my process to utilize liquors considerably unsaturated with KCl while yet maintaining low partial pressures of CO$_2$ over the carbonator discharge sludge. I accomplish this by forming, or providing, a carbonator discharge sludge containing a precipitate of K$_2$B$_{10}$O$_{16}$.8H$_2$O and a liquid portion essentially saturated with respect to K$_2$B$_4$O$_7$.4H$_2$O and Na$_2$B$_4$O$_7$.10H$_2$O, while containing, say, only about 25 parts/100 parts H$_2$O of KCl. By adding to, or forming, in this solution less NaHCO$_3$ than is required for saturation, I may effectively reduce the CO$_2$ partial pressure without otherwise seriously reducing the effectiveness of my process. For Example 4, I produce a carbonator discharge sludge having the following composition:

| | |
|---|---|
| KCl | 24.8 |
| K$_2$B$_4$O$_7$.4H$_2$O | 30.3 |
| Na$_2$B$_4$O$_7$.10H$_2$O | 9.6 |
| K$_2$B$_{10}$O$_{16}$.8H$_2$O | [1] 45.0 |
| NaHCO$_3$ | 11.0 |
| H$_2$O | 100.0 |

[1] Mostly present as precipitate.

The partial pressure of CO$_2$ over this sludge was found to be only 42 mm. at 35° C., which may be compared with the 62 mm. CO$_2$ pressure exhibited by the foregoing similar solution which was saturated with NaHCO$_3$ (16.6 parts), but which was otherwise practically identical with the present solution.

The sludge last mentioned contained about 38 parts of K$_2$B$_{10}$O$_{16}$.8H$_2$O/100 parts H$_2$O as a solid in suspension, and represented the discharge from a carbonator or absorber. The sludge was then subjected to desorption in the comparative manner hereinbefore described, with the following results:

| Temp. up to [1] | Percent of the CO$_2$ expelled at 100° C. | Ratio H$_2$O/CO$_2$ by weight |
|---|---|---|
| 75° C | 25 | 0.09 |
| 86° C | 33 | 0.21 |
| 95° C | 83 | 0.28 |
| 100° C | 100 | 0.56 |

[1] All solids in solution at 79° C.

The yield of CO$_2$ from the 100° C. desorption operation was approximately 0.19 pound per gallon based upon the original, fully carbonated sludge. The CO$_2$ partial pressure over the supersaturated, cooled desorber liquor was determined to be 16 mm. at 35° C.

As demonstrated in Example 2 of my process, the addition of excess potassium pentaborate octohydrate ($K_2B_{10}O_{16}.8H_2O$) over and above the stoichiometric quantity needed for the bicarbonate present greatly increases the efficiency of the desorber operation with respect to heat requirements, without affecting the $CO_2$ partial pressure over the equilibrium finished absorber solution. In the latest example (4), the addition of excess $K_2B_{10}O_{16}.8H_2O$ will also appreciably increase the $CO_2$ per gallon yield, and/or decrease the heat requirements. For example, upon increasing the amount of excess solid potassium pentaborate octohydrate to 60 grams/100 grams excess $H_2O$ in Example 4 of my process, and reproducing the desorbing operation (the results of which are tabulated above), the following values were obtained:

| Temp. up to [1]— | Percent of the $CO_2$ expelled at 100° C. | Ratio $H_2O/CO_2$ by weight |
| --- | --- | --- |
| 75° C | 19 | 0.11 |
| 85° C | 63 | 0.22 |
| 95° C | 85 | 0.31 |
| 100° C | 100 | 0.47 |

[1] All solids in solution at 86° C.

A yield of 0.24 pound of $CO_2$ per gallon was obtained. The $CO_2$ partial pressure over the fully carbonated sludge is the same as above, namely, 42 mm. at 35° C.

The partial pressure of $CO_2$ over the supersaturated desorbed liquor (after precipitation of some solids) was found to be 6 mm. at 35° C. This extremely low value results from the fact that practically no $NaHCO_3$ remained in the desorbed liquor.

It should be appreciated that the foregoing examples were selected to illustrate fundamental features of my invention. In commercial practice, satisfactory results may be achieved while departing somewhat from the conditions specified; in particular, although I have chosen examples wherein the solutions accompanying the sludge at the end of the carbonation operations were just saturated with sodium and potassium tetraborate compounds, some under-saturation or over-saturation with one or both of these materials may be tolerated in practice.

In all of the foregoing examples of my process the empirical expression of the analyses of the carbonator discharge liquors or sludges showed no sodium chloride (NaCl). In other words, the ratio of potassium to sodium present in the solutions is strongly in favor of the former alkali. I have discovered that too great an excess of sodium (shown as NaCl) in the expression of the analysis of the liquor may exert a deleterious effect upon the partial pressure of $CO_2$ over the carbonator liquor and may have other disadvantages. Only certain solutions which show "NaCl" on the empirical analyses are satisfactory. I have made such solutions the subject of a copending application, Serial No. 507,298, filed October 22, 1943, in which there is defined the conditions under which the liquors may contain "NaCl" as shown by the empirical analyses. The process of this application deals with liquors which show no sodium chloride (NaCl) in the empirical expression of the analyses of the carbonator discharge liquors or sludges.

By the empirical expression of the analyses of the carbonator discharge liquors or sludges, I have reference to the expression given in the preceding examples of the invention in which the liquors are reported as containing the following constituents only, potassium chloride (KCl), borax ($Na_2B_4O_7.10H_2O$), potassium tetraborate tetrahydrate ($K_2B_4O_7.4H_2O$), potassium pentaborate octohydrate ($K_2B_{10}O_{16}.8H_2O$), sodium bicarbonate ($NaHCO_3$) and water. Such an expression of the analyses of the carbonator discharge liquors or sludges is known as an empirical expression for the reason that present known analytical procedures do not analyze the solution as necessarily containing the constituents mentioned but in place the analytical procedures determine the contents of Na, K, $B_2O_3$, $CO_2$, Cl, and $H_2O$ present. These constituents are of course known to be combined but the analytical procedure does not in such a complex solution determine a particular manner of combining such constituents and any method of expressing the results of such analyses in the form of combined compounds, is necessarily empirical. The logical method of expressing such analyses in the form of combined compounds is to express the compounds in the forms in which they are either added to the solution or precipitated from the solution in the process. In the process of the present invention, since sodium bicarbonate is the only carbonate appearing in solid phase, the carbonate content of the solutions is therefore reported as sodium bicarbonate. Since potassium pentaborate octohydrate is precipitated this compound is reported. Since potassium chloride and sodium tetraborate decahydrate (or borax) are employed in making up the solution, these compounds are also reported as present.

Since potassium tetraborate tetrahydrate is in certain examples of the process also present as a solid phase this constituent is shown in the empirical expression of the analyses.

All of the solutions accompanying the carbonator discharge sludge used in the process of this invention can be empirically expressed in this manner. And when expressed in this manner the analysis of the solution is completely reported without showing any sodium chloride. There are solutions containing K, Na, $B_2O_3$, $CO_2$, Cl, and $H_2O$, which cannot be so reported and require the reporting also of NaCl in order to conform with the analysis made. Such solutions are the subject-matter of my copending applications previously mentioned. Matters described herein and not claimed, are subject-matter claimed in copending applications 507,299 and 507,300, filed October 22, 1943.

I claim:

1. A cyclic process for extracting carbon dioxide from gases, which comprises taking a sludge from a previous operation of the cycle containing solid potassium pentaborate octohydrate and a solution of potassium chloride, sodium bicarbonate, potassium pentaborate octohydrate, potassium tetraborate tetrahydrate, and sodium tetraborate decahydrate heating said sludge to dissolve the potassium pentaborate and to react the same with sodium bicarbonate to evolve carbon dioxide gas, thereafter cooling the resultant solution, contacting said solution with gases to absorb carbon dioxide and to again produce a sludge similar to the aforesaid sludge present at the start of the cycle.

2. A cyclic process for extracting carbon dioxide from gases which comprises taking a sludge from a previous operation of the cycle containing solid potassium pentaborate octohydrate and a solution of potassium chloride, sodium bicarbonate, potassium pentaborate octohydrate, potassium tetraborate tetrahydrate, and sodium tetraborate decahydrate, heating said sludge to dissolve potassium pentaborate and to react the same with sodium bicarbonate to evolve carbon dioxide, the quantity of solid potassium pentaborate octohydrate present at the start of the cycle being in excess of the amount needed to evolve said carbon dioxide, thereafter cooling the resultant solution, and contacting the cold solution with gases from which carbon dioxide is to be extracted to absorb carbon dioxide and to again produce a sludge similar to the aforesaid sludge present at the start of the cycle.

3. A cyclic process for extracting carbon dioxide from gases, which comprises taking a sludge from a previous operation of the cycle containing solid sodium bicarbonate, solid potassium pentaborate octohydrate, and a solution of potassium chloride, sodium bicarbonate, potassium pentaborate octohydrate, potassium tetraborate tetrahydrate, and sodium tetraborate decahydrate, heating said sludge to dissolve the solids and to react potassium pentaborate with sodium bicarbonate to evolve carbon dioxide gas, and thereafter cooling the resultant solution, and contacting the cold solution with gases to absorb carbon dioxide and to again produce a sludge similar to the aforesaid sludge present at the start of the cycle.

4. A cyclic process for extracting carbon dioxide from gases, which comprises taking a sludge from a previous operation of the cycle containing solid potassium pentaborate octohydrate and a solution of potassium chloride, sodium bicarbonate, potassium pentaborate octohydrate, potassium tetraborate tetrahydrate, and sodium tetraborate decahydrate, said solution being substantially saturated with tetraborate material, heating said sludge to dissolve the potassium pentaborate octohydrate and to react the potassium pentaborate with sodium bicarbonate to evolve carbon dioxide gas, thereafter cooling the resultant solution, and contacting said cold solution with gases to absorb carbon dioxide and to again produce a sludge similar to the aforesaid sludge present at the start of the cycle.

5. A cyclic process for extracting carbon dioxide from gases, which comprises taking a sludge containing solid potassium pentaborate octohydrate, and a solution of potassium chloride, sodium bicarbonate, potassium pentaborate octohydrate, potassium tetraborate tetrahydrate, and sodium tetraborate decahydrate, said solution being substantially saturated with potassium tetraborate tetrahydrate and sodium tetraborate decahydrate, heating said sludge to dissolve the solids and to react potassium pentaborate with sodium bicarbonate to evolve carbon dioxide gas, thereafter cooling the resulting solution, and contacting said cold solution with gases to absorb carbon dioxide and to again produce a sludge similar to the aforesaid sludge present at the start of the cycle.

6. A cyclic process for extracting carbon dioxide from gases, which comprises taking a sludge containing solid potassium pentaborate octohydrate and a solution of potassium chloride, sodium bicarbonate, potassium pentaborate octohydrate, potassium tetraborate tetrahydrate, and sodium tetraborate decahydrate, said solution being substantially saturated with tetraborate materials and also potassium chloride, heating said sludge to dissolve the solids and to react potassium pentaborate with sodium bicarbonate to evolve carbon dioxide gas, thereafter cooling the resulting solution to render it metastably supersaturated with respect to potassium tetraborate tetrahydrate, contacting said solution with gas to absorb carbon dioxide, and continuing said absorption with precipitation of potassium pentaborate octohydrate to produce a sludge similar to the aforesaid sludge present at the start of the cycle.

7. A process of extracting carbon dioxide from gases, which comprises preparing a sludge by mixing solid potassium chloride, sodium tetraborate decahydrate, sodium bicarbonate, potassium pentaborate octohydrate, and water in such proportions that the undissolved solids of the sludge consist essentially of potassium pentaborate octohydrate, heating this sludge so as to react sodium bicarbonate with the pentaborate to form and expel carbon dioxide, thereafter cooling the resulting liquor and absorbing carbon dioxide therein in such quantity as to precipitate potassium pentaborate octohydrate.

8. A process of extracting carbon dioxide from gases, which comprises preparing a sludge by mixing solid potassium chloride, sodium tetraborate decahydrate, sodium bicarbonate, potassium pentaborate octohydrate, and water in such proportions that the undissolved solids of the sludge consist substantially of sodium bicarbonate and potassium pentaborate octohydrate, heating this sludge so as to react sodium bicarbonate with the pentaborate and set free carbon dioxide, cooling the resulting liquor and absorbing carbon dioxide therein in such quantity as to precipitate potassium pentaborate octohydrate and sodium bicarbonate.

FRANK HENDERSON MAY.